US012591608B2

(12) United States Patent
Mohite et al.

(10) Patent No.: US 12,591,608 B2
(45) Date of Patent: Mar. 31, 2026

(54) SYSTEM AND METHOD FOR PROVIDING PERSONALIZED EXPLAINABLE RESPONSE BY GENERATING MULTIMEDIA PROMPT USING CONTEXTUAL INFORMATION

(71) Applicant: Tata Consultancy Services Limited, Mumbai (IN)

(72) Inventors: Jayantrao Mohite, Thane (IN); Dineshkumar Jang Bahadur Singh, Thane (IN); Vaibhav Sadashiv Lonkar, London (GB); Ashita Atulkumar Patel, Gandhinagar (IN); Jay Prakash Kumar, Bengaluru (IN); Suryakant Ashok Sawant, Pune (IN); Aditya Tiwari, Thane (IN); Srinivasu Pappula, Hyderabad (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 19/057,227

(22) Filed: Feb. 19, 2025

(65) Prior Publication Data

US 2025/0272323 A1 Aug. 28, 2025

(30) Foreign Application Priority Data

Feb. 22, 2024 (IN) .............................. 202421012794

(51) Int. Cl.
*G06F 16/334* (2025.01)
*G06F 16/435* (2019.01)
(Continued)

(52) U.S. Cl.
CPC ....... *G06F 16/334* (2019.01); *G06Q 30/0206* (2013.01); *G06Q 50/02* (2013.01)

(58) Field of Classification Search
None
See application file for complete search history.

(56) References Cited

U.S. PATENT DOCUMENTS

2019/0019507 A1* 1/2019 Abrahams ................ G06N 5/04
2023/0245651 A1 8/2023 Wang
2025/0200034 A1* 6/2025 Raviv ................ G06Q 30/0242

OTHER PUBLICATIONS

Kelong Mao; Large Language Models Know Your Contextual Search Intent: A Prompting Framework for Conversational Search; arXiv; 2023 ; pp. 1-15.*

(Continued)

*Primary Examiner* — Ann J Lo
*Assistant Examiner* — Jermaine A Mincey
(74) *Attorney, Agent, or Firm* — Finnegan, Henderson Farabow, Garrett & Dunner, LLP

(57) ABSTRACT

This disclosure relates generally to system and method for providing personalized explainable response by generating personalized context-aware prompt using contextual information. Agriculture faces critical challenges such as adverse climate, pest/disease outbreak, soil, degradation and the like due to which personalized, contextual and explainable advisories are needed to achieve sustainable and optimal agricultural productivity. The method receives a multimedia user query to provide personalized explainable response using initial validation and a personalized context generation. Further, a personalized context aware prompt is generated to obtain response from a plurality of LLM's. Simultaneously, a contextually relevant user profile is composed to generate a personalized explainable response. Additionally, the method is capable of providing the personalized explainable response in multilingual and multimodal content. Further, feedback form enables the user to provide feedback which enables adaptive improvement and storing the context, per- (Continued)

sonalized explainable response, and feedback in a blockchain platform and a prompt library.

20 Claims, 4 Drawing Sheets

(51) Int. Cl.
*G06Q 30/0201* (2023.01)
*G06Q 50/02* (2024.01)

(56) References Cited

OTHER PUBLICATIONS

Sandesh Swamy et al., "Contextual Dynamic Prompting for Response Generation in Task-oriented Dialog Systems", Proceedings of the 17th Conference of the European Chapter of the Association for Computational Linguistics, Association for Computational Linguistics, pp. 3102-3111 (2023).

* cited by examiner

300 receiving from a user a multimedia user query, wherein the multimedia user query is received in at least one of a form comprising a text query, an image query, an audio query, a video query, and combination thereof

302 validate the multimedia user query relates to agricultural domain by computing a query relevancy score, wherein the query relevancy score with a low value triggers to terminate the process and receives a new multimedia user query, and the query relevancy score with a high value

304 extract a contextual data from the multimedia user query using at least one AI model, wherein the contextual data includes an agricultural field information, an environmental conditions of the agriculture field, and activities performed by the user in the agricultural field

306 obtain a query insights from the multimedia user query, using atleast one AI model or NLP based techniques

308 obtain for the multimedia user query one or more relevant indicators from a knowledge graph based on the contextual data, and the query insights

310 generate a personalized context for the multimedia user query using the contextual data and the one or more relevant indicators

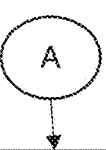

query a predefined prompt library comprising a plurality of baseline prompts to retrieve one or more matching prompts for the personalized context, wherein each prompt in the prompt library comprise a tagged category based on the context, topic, keywords, and domain specificity

314 generate using a context and domain aware generative AI model a personalized context aware prompt when no desired prompt is identified in the prompt library for the multimedia user query, wherein the personalized context aware prompt is generated using the plurality of baseline prompts,

316 transmit the personalized context aware prompt to a plurality of large language models (LLMs) to obtain one or more responses

318 validate the one or more responses received for the personalized context aware prompt from the plurality of large language models to identify response

320 predict a contextually relevant user profile to compose the response suitable to the multimedia user query

322 generate a personalized explainable response for the multimedia user query based on the response, contextually relevant user profile, and storing the multimedia user query with context and corresponding personalized explainable response in a blockchain platform and the prompt library

324 trigger to receive a feedback form from the user for the personalized explainable response and store in the blockchain platform and the prompt

SYSTEM AND METHOD FOR PROVIDING PERSONALIZED EXPLAINABLE RESPONSE BY GENERATING MULTIMEDIA PROMPT USING CONTEXTUAL INFORMATION

PRIORITY CLAIM

This U.S. patent application claims priority under 35 U.S.C. § 119 to: Indian Patent Application number 202421012794, filed on Feb. 22, 2024. The entire contents of the aforementioned application are incorporated herein by reference.

TECHNICAL FIELD

The disclosure herein generally relates to personalized explainable response, and, more particularly, to system and method for providing personalized explainable response by generating multimedia prompt using contextual information.

BACKGROUND

Artificial Intelligence revolutionized a variety of sectors, including healthcare, finance, transportation, education, agriculture, and the like. Agriculture is a critical sector that impacts the lives of individuals worldwide. It serves as a foundation for providing food, fiber, and fuel, yet faces several challenges, such as climate change, soil degradation, water scarcity, and food security. Artificial general intelligence (AGI) in agriculture has the potential to tackle these issues by enhancing crop yields, reducing waste, and promoting sustainable farming practices. It can also help farmers make informed decisions by leveraging real-time data, leading to more efficient and effective farm management.

In recent years, with rapid development of internet and multimedia technology, large amount of agriculture related information is rapidly accumulated and widely used. To increase the productivity and quality of crops, farmers or agriculturist often depend on agricultural advisors and experts to provide correct information for making decision for crop. Many times, agricultural expert or advisors are not available all the time to address agriculturist queries.

However, digitized agriculture monitoring system farmers or user faces critical challenges such as unpredictable weather patterns, unforeseen outbreak of pests and diseases, inadequate irrigation infrastructure, soil degradation, and outdated farming practices. In addition, advising farmers requires various factors from the agriculture field of the user. In addition, market volatility and limited access disrupts income stability. To address such challenges, farmers need personalized and contextual advisories for agricultural productivity. However, existing systems are general in context and lack in providing personalized recommendation for farmers in common and regional languages.

Existing methods generate prompts for diverse set of tasks using a gradient-guided search and template. Such AUTO-PROMPT prompt-based probes are suitable in just one tool in the toolbox of interpretability researcher. Another downside is AUTOPROMPT requires labeled training data due to lack of reliance on domain or language insights. AUTO-PROMPT generated prompts lack interpretability with human designed prompts. Also, AUTOPROMPT can sometimes struggle when training data is highly imbalanced. Existing method provides an implicit overlap when looking at it from mere automated prompt generation perspective, however combining various relevant datapoints with knowledge graph to generate the context and using that for prompt generation has not been attempted in literatures.

In another existing method, Prompt tuning is an NLP transfer learning paradigm that adds a task-specific prompt in each input instance during the model training stage. Existing works observed the fine-tuned LLMs results in better performance than directly using vanilla pre-trained models. However, such method lack in creating context with the contextual data to create and then contextual prompts.

In recommender systems analysis and mining of massive amounts of various types of user data including demographics, preferences, social interactions are required to develop accurate and precise recommendations. Such datasets often include sensitive information, yet most recommender systems are focusing on the model's accuracy and ignore issues related to security and users' privacy. Such recommender systems lack in providing scalable Blockchain platform to promote security and privacy preservation, not only because of its security and privacy salient features, but also due to its resilience, adaptability, fault tolerance and trust characteristics. Current personalized recommendation systems often suffer from limitations in terms of data quality and quantity or lack contextual knowledge.

SUMMARY

Embodiments of the present disclosure present technological improvements as solutions to one or more of the above-mentioned technical problems recognized by the inventors in conventional systems. For example, in one embodiment, a system for providing personalized explainable response by generating multimedia prompt using contextual information is provided. The system includes receiving from a user a multimedia user query, wherein the multimedia user query is received in at least one of a form comprising a text query, an image query, an audio query, a video query, and combination thereof. The multimedia user query is validated for domain relevancy corresponds to agricultural domain by computing a query relevancy score. The query relevancy score with a low value triggers to terminate the process and receives a new multimedia user query, and the query relevancy score with a high value triggers to extract contextual data.

Further, a contextual data from the multimedia user query is extracted using at least one AI model. The contextual data includes an agricultural field information, an environmental conditions of the agriculture field, and activities performed by the user in the agricultural field. Then, a query insights is obtained from the multimedia user query using at least one AI model or NLP based techniques to obtain one or more relevant indicators from a knowledge graph based on the contextual data, and the query insights. Further, a personalized context is generated for the multimedia user query using the contextual data and the one or more relevant indicators. Further, a context and domain aware generative AI model is utilized to generate a personalized context aware prompt when no desired prompt is identified in the prompt library for the multimedia user query. The personalized context aware prompt is generated using the plurality of baseline prompts, the query insights, and the personalized context.

Furthermore, the personalized context aware prompt is transmitted to a plurality of large language models (LLMs) to obtain one or more responses. Further, the one or more responses are validated for the personalized context aware prompt from the plurality of large language models to identify response based on similarity matching and iterative refinement to predict a contextually relevant user profile to compose the response suitable to the multimedia user query.

Furthermore, a personalized explainable response for the multimedia user query is generated based on the response, contextually relevant user profile, and storing the multimedia user query with corresponding personalized explainable response in a blockchain platform and the prompt library and a feedback form is triggered to receive from the user for the personalized explainable response.

In another aspect, a method for providing personalized explainable response by generating multimedia prompt using contextual information is provided. The method includes receiving from a user a multimedia user query, wherein the multimedia user query is received in at least one of a form comprising a text query, an image query, an audio query, a video query, and combination thereof. The multimedia user query is validated for domain relevancy corresponds to agricultural domain by computing a query relevancy score. The query relevancy score with a low value triggers to terminate the process and receives a new multimedia user query, and the query relevancy score with a high value triggers to extract contextual data.

Further, a contextual data from the multimedia user query is extracted using at least one AI model. The contextual data includes an agricultural field information, an environmental conditions of the agriculture field, and activities performed by the user in the agricultural field. Then, a query insight is obtained from the multimedia user query using at least one AI model or NLP based techniques to obtain one or more relevant indicators from a knowledge graph based on the contextual data, and the query insights. Further, a personalized context is generated for the multimedia user query using the contextual data and the one or more relevant indicators. Further, a context and domain aware generative AI model is utilized to generate a personalized context aware prompt when no desired prompt is identified in the prompt library for the multimedia user query. The personalized context aware prompt is generated using the plurality of baseline prompts, the query insights, and the personalized context.

Furthermore, the personalized context aware prompt is transmitted to a plurality of large language models (LLMs) to obtain one or more responses. Further, the one or more responses are validated for the personalized context aware prompt from the plurality of large language models to identify response based on similarity matching and iterative refinement to predict a contextually relevant user profile to compose the response suitable to the multimedia user query.

Furthermore, a personalized explainable response for the multimedia user query is generated based on the response, contextually relevant user profile, and storing the multimedia user query with corresponding personalized explainable response in a blockchain platform and the prompt library and a feedback form is triggered to receive from the user for the personalized explainable response.

In yet another aspect, a non-transitory computer readable medium for providing personalized explainable response by generating multimedia prompt using contextual information is provided. The system receives from a user a multimedia user query, wherein the multimedia user query is received in at least one of a form comprising a text query, an image query, an audio query, a video query, and combination thereof. The multimedia user query is validated for domain relevancy corresponds to agricultural domain by computing a query relevancy score. The query relevancy score with a low value triggers to terminate the process and receives a new multimedia user query, and the query relevancy score with a high value triggers to extract contextual data.

Further, a contextual data from the multimedia user query is extracted using at least one AI model. The contextual data includes an agricultural field information, an environmental conditions of the agriculture field, and activities performed by the user in the agricultural field. Then, a query insights is obtained from the multimedia user query using at least one AI model or NLP based techniques to obtain one or more relevant indicators from a knowledge graph based on the contextual data, and the query insights. Further, a personalized context is generated for the multimedia user query using the contextual data and the one or more relevant indicators. Further, a context and domain aware generative AI model is utilized to generate a personalized context aware prompt when no desired prompt is identified in the prompt library for the multimedia user query. The personalized context aware prompt is generated using the plurality of baseline prompts, the query insights, and the personalized context.

Furthermore, the personalized context aware prompt is transmitted to a plurality of large language models (LLMs) to obtain one or more responses. Further, the one or more responses are validated for the personalized context aware prompt from the plurality of large language models to identify response based on similarity matching and iterative refinement to predict a contextually relevant user profile to compose the response suitable to the multimedia user query.

Furthermore, a personalized explainable response for the multimedia user query is generated based on the response, contextually relevant user profile, and storing the multimedia user query with corresponding personalized explainable response in a blockchain platform and the prompt library and a feedback form is triggered to receive from the user for the personalized explainable response.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 3A and FIG. 3B (collectively referred as FIG. 3) depicts a flow diagram of an example process for generating personalized explainable response for the prompt generated from the multimedia user query using the system of FIG. 1, in accordance with an embodiment of the present disclosure.

DETAILED DESCRIPTION

Figure 1:
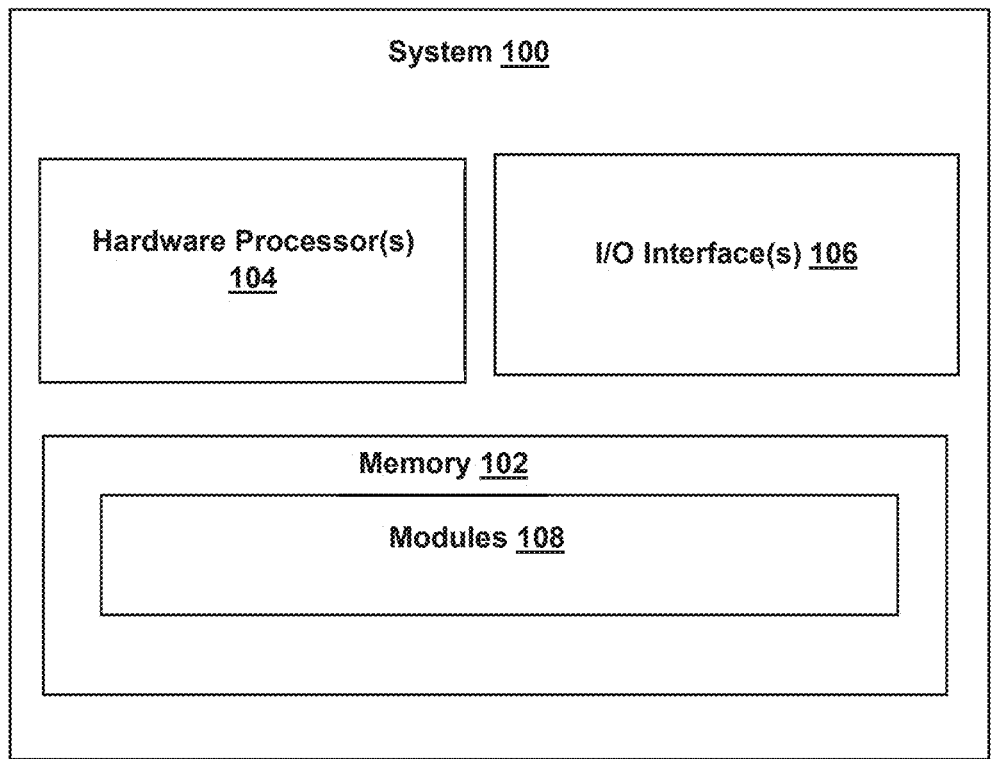
FIG. 1 is an illustrative system (alternatively referred as personalized prompt response generation system), in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Modern information technology facilitate crop specific advisories pertaining to the requirements for a user multimedia query. The user may be alternatively referred as farmer or agriculturist or researcher and the like. Today, information and communication technology (ICT) is vital in delivering responsive agricultural extension services to farmers. Current agricultural extension approaches face many difficulties in delivering timely, reliable, and relevant information to farmers. When engaged in farming activities, farmers need different types of information at each stage of crop development process from weather forecast, input management, farming practices, pest and disease management, and market information and prices.

In complex decision-making process during farm operations, farmers are exposed to various kinds of innovative information, and must select the one that best fits their farm with risk minimization and profit maximization. Depending on the nature of the information farmers use their preferred sources such as fellow farmers, progressive farmers, television, radio, newspapers, private agents, and mobile phones. Information seeking behavior of individuals varies according to the complexity of the task, time of operation, location, and availability of information sources.

To facilitate user or farmer with crop specific advisories a mobile device may be used to receive multimedia query. Multimedia user query may be for example text, audio, image, video, and combination thereof. Answers to the multimedia user query or questions have potential implications for refining the approach making efficient agricultural extension services available through a call center platform, equipped with mobile multimedia agricultural advisory system to the rural farming communities.

Existing recommendation methods attempt to provide response for the multimedia user query based on the problem faced by the farmer but may not consider attributes relevant to the user to tailor recommendation to the user or farmer profile. It is also noted that existing systems also lack in critical challenges comprising language and user interface, literacy, trust issues, data accuracy and reliability, and explainable solutions.

Achieving both high accuracy, interpretability, efficiency, and affordability of agricultural information are prerequisites for achieving defined targets to increase agricultural productivity. Public extension system responsible for disseminating agricultural information to farmers have become less efficient, more time-consuming and does not meet their requirements.

As used herein, the term "Explainability" refers to transparency in advisory system.

Explainable AI is a pathway to allow humans to explore and understand inner working of complex systems. Explainable AI for smart farming can be beneficial over traditional artificial intelligence (AI) because it helps to build trust in the technology and ensures that farmers can understand recommendations provided by the AI systems. The present disclosure provides a model agnostic metric to measure "Degree of Explainability" of information in an objective way by using a specific theoretical model from Ordinary Language Philosophy called Achinstein's Theory of explanations implemented with a technique relying on deep language models for knowledge graph extraction and information retrieval. "Explainability" from the perspective of the end user (farmer) in the context of the "domain knowledge" and "technical process" generate advisories or recommendation. Existing approaches for personalized recommendations do not consider explainability component of language learning model (LLM) outputs integrated with blockchain technology.

Some of the existing systems challenges includes 1. Automomous generation of contextual and precise prompts by combining rich array of information. 2. Limited validation of response quality and relevance from Large Language Models (LLMs) perspective. 3. Combining individual capabilities of stand-alone AI or ML models, semantic and reasoning capabilities of multiple LLMs to generate contextual and personalized recommendation.

The present disclosure provides a system and method for providing personalized response by generating multimedia prompt using contextual information. The system may be alternatively referred as personalized prompt response generation system 100. The system 100 provides a holistic approach for response tailoring using user or farmer profile and other contextual information. The system 100 is capable of, 1. generating personalized context aware prompts based on the diverse set of inputs such as queries received from the farmers, models outputs and farmer profile associated with the farm considering relevance and a weighted average for comprehensive assessment. Validation of responses received from the each LLM are enhanced through iterative refinement, a similarity algorithm, and response validation ensuring both quality and relevance. 2. Combining individual capabilities of stand-alone AI or ML models and semantic and reasoning capabilities of two or more LLMs to generate contextual and personalized recommendations which are tailored to user profiles. The system 100 enables tailoring of responses based on user profiles, considering literacy levels, preferences, and past interactions. The integration of Blockchain platform ensures secure and transparent storage of response details, overcoming existing literature challenges in data integrity and transparency. Additionally, the system adds value with farmer feedback mechanisms for improvement with various channels for collection, remote monitoring, compliance assessment, and reinforcement learning for continuous system enhancement.

Initially, the user feeds a multimedia user query as input via the mobile device to obtain response. The system 100 validates domain specific relevancy of the multimedia user query for domain relevance validation. Further, contextual data and query insights are obtained from the multimedia user query using at least one AI model or NLP techniques. Further, for the multimedia user query one or more relevant indicators from a knowledge graph are obtained based on the contextual data and the query insights. Then, a personalized context is generated using the contextual data and the one or more relevant indicators. Further, a prompt library is queried to obtain matching prompts for the personalized context and when no matching prompts are identified a personalized context aware prompt is generated. The personalized context aware prompt is further transmitted to a plurality of large language models (LLMs) to obtain one or more responses which are further validated to select relevant response. Further, the system 100 generates a personalized explainable response selected using attributes of user profile.

The method of the present disclosure links the response from the plurality of LLMs and actionable information needed by the farmer for increasing productivity from time to time. Additionally, the method employs a dynamic fusion of information sources, ensuring the resulting prompts are tailored to the farmer's unique contextual data. Also, the system and method of the present disclosure is robust and scalable in providing contextual explainable response to the user accurately and providing a feedback to autotune the system based on user experience. The disclosed system is further explained with the method as described in conjunction with FIG. 1 to FIG. 3 below.

Figure 2:
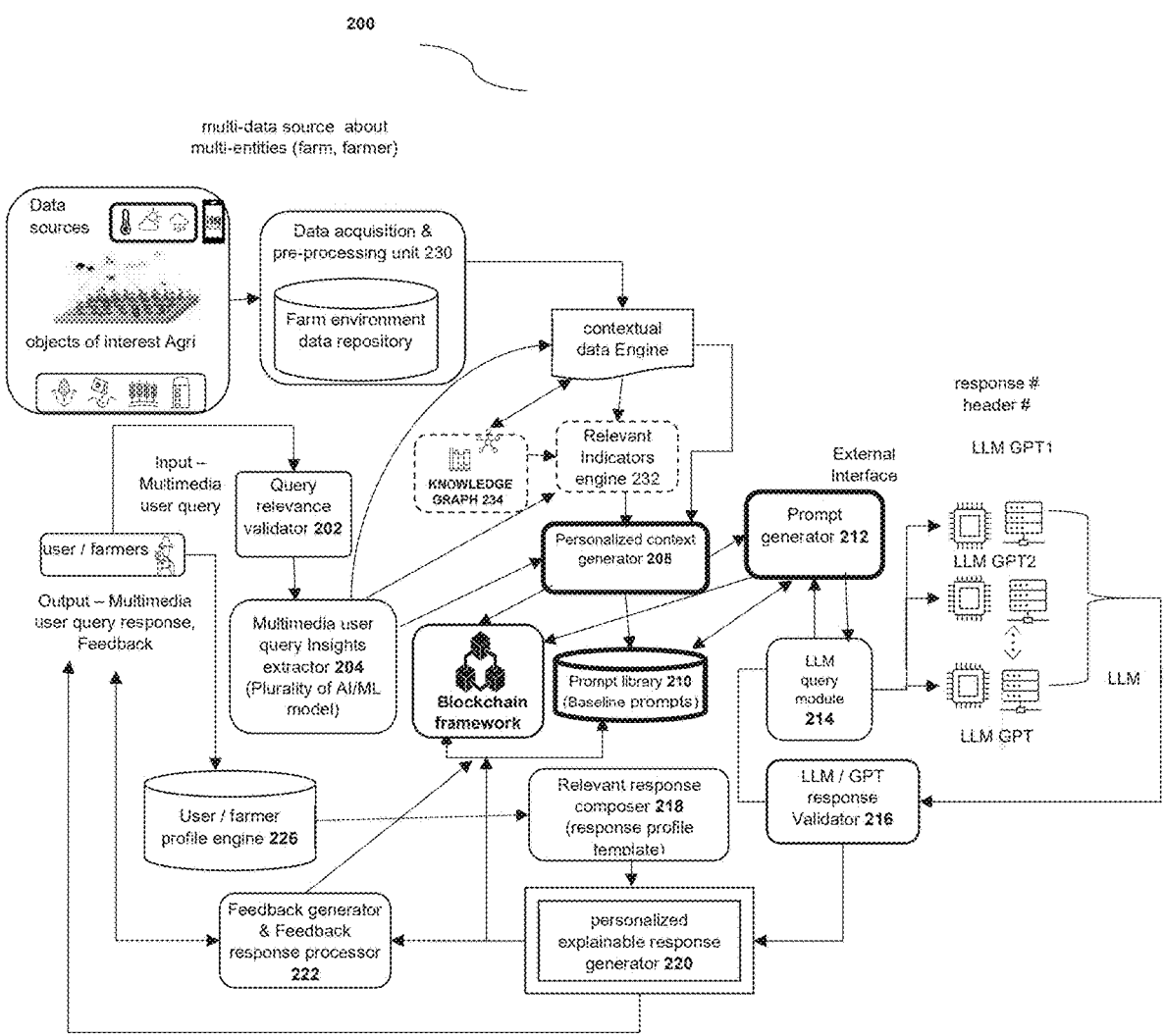
FIG. 2 illustrates a block diagram of an example for generating personalized explainable response for a multimedia user query, in accordance with an embodiment of the present disclosure.

Referring now to the drawings, and more particularly to FIG. 1 through FIG. 3, where similar reference characters denote corresponding features consistently throughout the figures, there are shown preferred embodiments, and these embodiments are described in the context of the following exemplary system and/or method.

FIG. 1 is an illustrative system (alternatively referred as personalized prompt response generation system), in accordance with some embodiments of the present disclosure. In an embodiment, the batch processing system 100 includes processor(s) 104, communication interface (s), alternatively referred as or input/output (I/O) interface(s) 106, and one or more data storage devices or memory 102 operatively coupled to the processor(s) 104. The system 100, with the processor(s) is configured to execute functions of one or more functional blocks of the system 100.

Referring to the components of the system 100, in an embodiment, the processor(s) 104 can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the processor(s) 104 is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud, and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) 106 can include one or more ports for connecting a number of devices (nodes) of the system 100 to one another or to another server.

The memory 102 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes.

In an embodiment, the memory 102 includes a plurality of modules 108 can also include various sub-modules as depicted in FIG. 2. such as a query relevance validator 202, a multimedia user query insights extractor 204, a contextual data engine 206, a personalized context generator 208, a prompt library 210, a prompt generator 212, a LLM query module 214, a LLM response validator 216, a relevant response composer 218, a personalized explainable response generator 220, a feedback generator & feedback response processing 222, a Blockchain framework 224, a user profile engine 226, a data acquisition & pre-processing unit 230, a data acquisition & pre-processing unit 230 comprise a farm environment data repository, a relevant indicators engine 232, and a knowledge graph 234. The plurality of modules 108 include programs or coded instructions that supplement applications or functions performed by the system 100 for executing different steps involved in the process of providing personalized response by generating multimedia prompt using the system 100. The plurality of modules 108, amongst other things, can include routines, programs, objects, components, and data structures, which performs particular tasks or implement particular abstract data types. The plurality of modules 110 may also be used as, signal processor(s), node machine(s), logic circuitries, and/or any other device or component that manipulates signals based on operational instructions. Further, the plurality of modules 108 can be used by hardware, by computer-readable instructions executed by the one or more hardware processors 104, or by a combination thereof.

The memory 102 may comprise information pertaining to input(s)/output(s) of each step performed by the processor(s) 104 of the system 100 and methods of the present disclosure. Functions of the components of system 100, generates personalized explainable response for the multimedia user query, are explained in conjunction with FIG. 2, FIG. 3A and FIG. 3B providing flow diagram, architectural overviews, and performance analysis of the system 100.

FIG. 2 illustrates a functional block diagram of an example system for generating personalized explainable response for a multimedia user query, in accordance with an embodiment of the present disclosure.

The system 200 may be an example of the system 100 (FIG. 1). In an example embodiment, the system 200 may be embodied in, or is in direct communication with the system, for example the system 100 (FIG. 1). In an embodiment, the system 200 may be alternatively referred as a personalized prompt response generation system. The system 200 includes a query relevance validator 202, a multimedia user query insights extractor 204, a contextual data engine 206, a personalized context generator 208, a prompt library 210, a prompt generator 212, a LLM query module 214, a LLM response validator 216, a relevant response composer 218, a personalized explainable response generator 220, a feedback generator & feedback response processing 222, a Blockchain framework 224, a user profile engine 226, a data acquisition & pre-processing unit 230, a data acquisition & pre-processing unit 230 comprise a farm environment data repository, a relevant indicators engine 232, and a knowledge graph 234.

Referring to an example, where the user or farmer requests an Agri service provider to provide response or resolution related to farm activities category or incident. The user may provide a multimedia user query to the Agri service operations to provide relevant response or advisories and thereof. The multimedia user query can be in the form of text query, image query, video query, audio query or combination thereof. The category may include for example advisory related to crop, farming operations, sowing, crop related queries, and the like.

The multimedia user query response shall vary based on attributes including but are not limited to user's profile such as preferences, digital literacy level, past interactions, technical understanding of the agriculture activities and the like. Considering few example scenarios as depicted below, Scenario 1, if the user is asking about the incident by providing relevant parameters. Considering the user is unskilled, traditional farmer, the query may be for example, "Our soybean leaves have this white powder; what does
    it mean, and how do we fix it?"
  "What do I need to do with our soybean crop the way my
    ancestors did to fight this disease?"

"Can you share any wisdom passed down through generations on dealing with powdery disease on soybeans?"

Scenario 2, if the user is asking about the incident by providing relevant parameters along with additional incident information. Considering the user is semi-skilled with agricultural knowledge, the user query may be for example, "We've got powdery disease on our soybean plants. What traditional remedies or practices can we apply to control it?"

"What kind of crop rotation or companion planting techniques can help prevent this disease in the future?"

"Are there any specific local experiences you can share about dealing with powdery disease on soybeans?"

Scenario 3, if the user is providing multiple incidents along with location and crop information, there is change in response. Considering the user is skilled, educated agriculturist, the user query may be for example, "I've noticed powdery disease on our soybean leaves. Can you explain the specific symptoms we should be looking for?"

"Are there any advanced technological methods to diagnose and manage this disease effectively?"

"Could you recommend any solutions or tools to prevent the spread of this disease?"

Once the multimedia user query is received, the system 200 provide response utilizing the plurality of modules of FIG. 2 as discussed below. The query relevance validator 202 receives the multimedia user query and validates if the received query is domain specific for example agriculture. The user can provide the query in multiple forms, including a text query, an image query, an audio query, and a video query. Each form of the query is validated for domain relevancy by comparing with an agricultural knowledge graph and by employing specific matching algorithms tailored to the respective data type.

Further, the multimedia user query insights extractor 204 analyses the query provided by the user to extract multimedia user query insights using AI or ML models.

The contextual data engine 206 extracts comprehensive contextual data pertaining to the farmer's query scenario. The data encompasses information about the farmer's or users farm with corresponding surrounding environment, soil conditions, weather, forecasts, the farmer's profile, and the like.

The personalized context generator 208 generates context by harmonizing information from various sources based on the farmer's query, environmental conditions, and the data collected from the above modules of the system 200. This context is crucial for understanding the farmer's specific query scenario such as identifying the crop, growth stage, and potential issues.

The prompt library 210 is a predefined library having a plurality of baseline prompts where each prompt is tagged or categorized based on the context, topic, keywords, and specificity of the query. Prompts may vary based on farming scenario, crop type, growth stage, climate, and other parameters.

The prompt generator 212 generates a personalized contextually aware prompt for the user query when no desired prompt exist in the prompt library 210 utilizing a personalized context, the knowledge gap, and the parameters extracted from the knowledge graph.

The LLM query module 214 transmits the personalized contextually aware prompt to the plurality of LLMs or a generative pretrained transformer (GPTs) external interface to receive one or more relevant responses for the query.

The LLM response validator 216 validates the one or more responses received from each LLM.

The relevant response composer 218 identifies relevant response for the user query using iterative refinement and a stopping criteria. This provides tailored responses to align with specific needs, preferences, and characteristics of the farmer. Further, a comprehensive user profile includes a range of attributes to craft responses corresponding to the farmer.

The personalized explainable response generator 220 is combined with the user profile attributes to generate a final response using at least one of a contextual explanation, a semantic explanation, and a technical explanation based on user profile providing literacy, knowledge and understanding level of the user.

The feedback generator & feedback response processing 222 triggers a feedback to the user to obtain a response and actively collects feedback from the farmer to gauge the response relevance and usefulness. Feedback can take various forms including surveys, ratings, or other user input channels, ensuring that the system understands the farmer's perspective and experience. Also, feedback may have remote monitoring capabilities utilizing data from remote sensing technologies and relevant in-situ sensors. Such in-situ sensors are capable of capturing real-time invasive data or real-time non-invasive data on environmental conditions, crop health, and pest or disease presence. The data collected from such sensors contributes to holistic understanding of the farmer's situation.

Blockchain framework 224 is a storage engine to record data corresponding to the user query with corresponding personalized explainable response, the personalized context, the personalized context aware prompt. This framework may be utilized for new related user query is received. The framework have structured data which facilitates autolearning and improvement and also enables secure communication of responses back to users.

The user profile engine 224 stores the user profile querying the system considering literacy level, user preferences, past interactions, historical information about the user farming practices, past pest issues, disease management, and other relevant attributes.

The data acquisition & pre-processing unit 230 comprise a farm environment data repository which stores inputs related to various farm sensors comprising temperature, climatic condition, remote sensor data, crop related activities and the like. The data acquisition & pre-processing unit 230 collects farmer input data comprising textual or multimedia (images/videos/voice) data. The on-farm sensor data collects sensor data associated with the farm including information about farm resources. Satellite remote sensing observations obtains sensing data about the farm. Farmer profile data obtains farmer specific information including preferences, digital literacy, past interactions, and historical farm data. Crop specific data includes datasets related to different crops, varieties, growth stages, and recommended practices. Weather data obtains multi-year, historical and predicted weather data for the selected farm area. Agroclimatic profile data of the selected farm zone, as prescribed by the local agricultural university, local government on the recommended crop, water availability from different water sources such as canal, dam, reservoir, general soil moisture for a given region and season. Market price data provides historical market price data for the selected crop at national and regional level to help decide the potential crop recommendation and other information associated with the farm.

Knowledge graph 234 is structured to store information about various attributes related to the farm. This includes the crop type, specific crop variety, growth stage, regional data, weather conditions, pest, diseases affecting the region and farm, parameter impacting those pest or diseases and their casual relationships. These attributes are interconnected, allowing for a holistic understanding of the farmer's farm.

Relevant indicators 232 are obtained from the knowledge graph based on the contextual data and the multimedia user query insights.

Figure 3A:
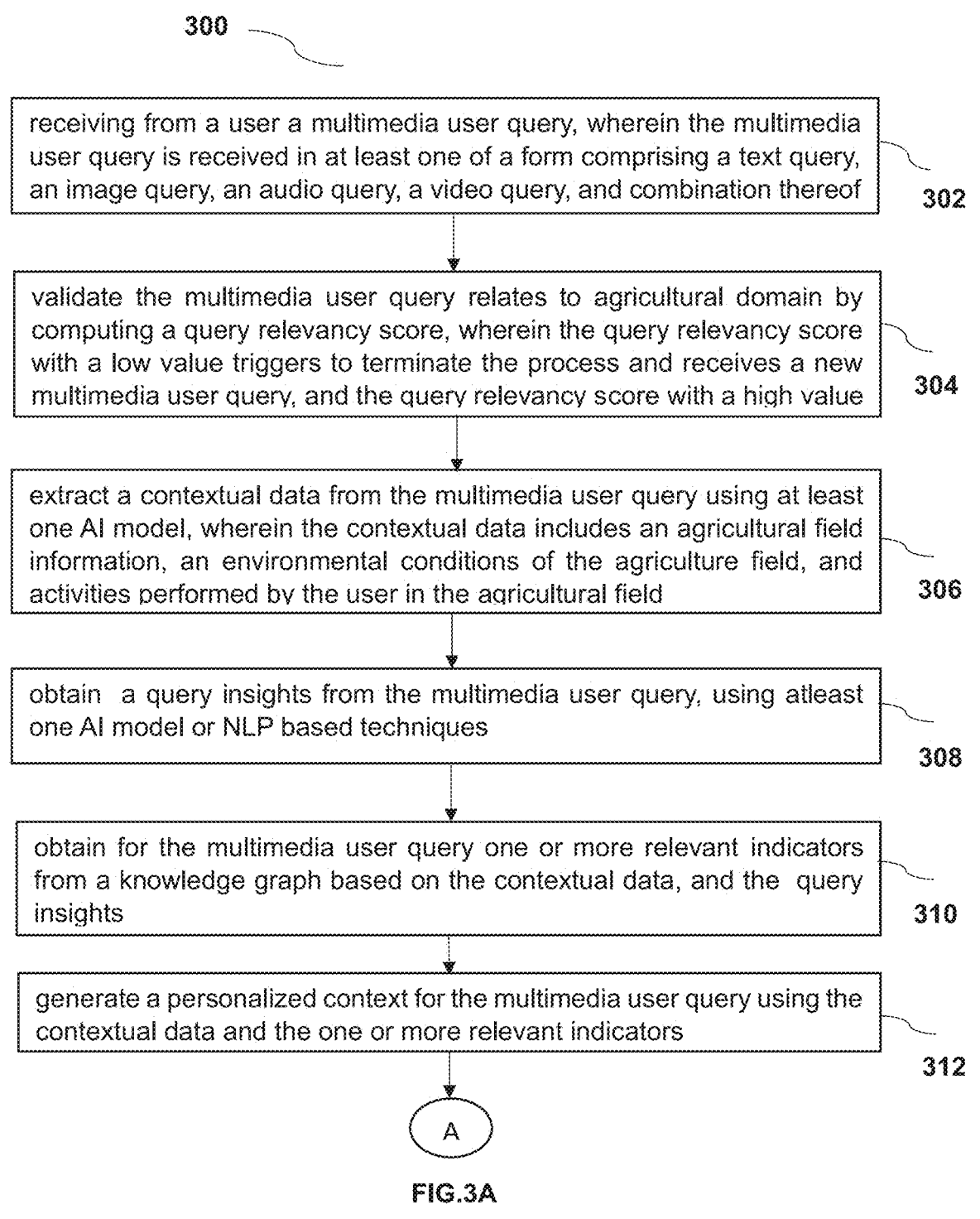

FIG. 3A and FIG. 3B (collectively referred as FIG. 3) depicts a flow diagram of an example process for generating personalized explainable response for the prompt generated from the multimedia user query using the system of FIG. 1, in accordance with an embodiment of the present disclosure.

In an embodiment, the system 100 comprises one or more data storage devices or the memory 102 operatively coupled to the processor(s) 104 and is configured to store instructions for execution of steps of a method 300 by the processor(s) or one or more hardware processors 104. The steps of the method 300 of the present disclosure will now be explained with reference to the components or blocks of the system 100 as depicted in FIG. 1 through FIG. 2, and the steps of flow diagram as depicted in FIG. 3. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring to the steps of the method 300, at step 302 a one or more hardware processor is configured to receive from a user a multimedia user query, wherein the multimedia user query is received in at least one of a form comprising a text query, an image query, an audio query, a video query, and combination thereof The growers can rapidly and efficiently provide user query and receive responses containing information pertaining to the fields. The information may include indications of the fields that have nutrients deficiencies or need to be inspected. The information may also include indications of expected yield outcomes, weather notifications or planting information. Contextual search queries may also be supported.

For example, the system 100 begins with the farmer submitting a multimedia user query. The farmer's multimedia query serves as an input to the system to generate a personalized explainable response. Here, the farmer submits an image query of a soybean leaf with visible signs of powdery mildew. Alongside the image query, the farmer records an audio message describing the issue, stating, "I've noticed powdery mildew on my soybean leaves. It's getting worse, and I need help addressing it."

TABLE 1

| Example multimedia - Image query |
| --- |
| "I've noticed powdery mildew on my soybean leaves. It's getting worse, and I need help addressing it." |

The query is further processed by the query relevance validator 202 as described below in the next step.

TABLE 2

| Example multimedia - Text query |
| --- |
| "Given the presence of powdery mildew in your Williams 82 variety soybean crop in the flowering stage (R2) in the Midwest region during a hot and dry summer season, what would be the most effective strategy to manage this issue? We've noticed occasional humidity in your region. Additionally, you've dealt with powdery mildew in the past and applied fungicides. What's your best course of action to combat the current problem effectively?" |

At step 304 of the method 300 the one or more hardware processors are configured to validate the multimedia user query relates to agricultural domain by computing a query relevancy score, wherein the query relevancy score with a low value triggers to terminate the process and receives a new multimedia user query, and the query relevancy score with a high value triggers to extract contextual data.

Once the multimedia user query is received as described in Table 1 (Example multimedia—Image query), the query relevance validator 202 validates the user query relates to agricultural domain by computing the query relevancy score. The multimedia user query can take multiple forms including the text query, the image query, the audio query, the video query, and combination thereof. Each form of the query is validated for relevance by comparing it with the agricultural knowledge graph or repository and employs specific matching algorithms tailored to the respective data type. The agricultural knowledge graph includes a repository of agricultural information, including agricultural vocabulary, image data, video data, text data related to crops, pests, diseases, and best practices.

Referring to the Table 1 (Example multimedia-Image query) if the farmer submits the image query as input. The query relevance validator 202 processes the image query with matching images from the agriculture knowledge graph and computes the query relevance score.

Now referring to other forms of multimedia user query received from the user being processed as described below, Text Query: If the farmer submits the text query as input. The query relevance validator 202 processes the text query by comparing with the agricultural repository containing information on agricultural vocabulary, crops, pests, diseases, and best practices. Further, a similarity metric is computed between the textual content of the text query and matching semantic text associated with an agriculture knowledge repository. Here, the text similarity metric may be cosine similarity which is used to measure resemblance between the text query and the agriculture knowledge repository. The query relevance score for the text query is determined based on the similarity metric using the Equation 1, $$\text{Equation 1}$$

$$\text{Text Query Relevance Score}\,(R\_text) = \text{Similarity}(QT, \text{Knowledge Base})$$

Further, the computed query relevancy score is compared with a query threshold, where the low value triggers to terminate the process and receives the new multimedia user query. The query relevancy score with high value triggers to extract contextual data in the next step. The query threshold can take the values from 0 to 1, with values towards 0 indicating no or low relevance and values towards 1 indicating high relevance.

Image Query: If the farmer submits the image query as input. The query relevance validator 202 processes the image query with matching images from the agriculture knowledge repository. Similarity between the image query and the images in the agriculture knowledge graph or repository are evaluated using techniques such image feature extraction and template matching. Further the query relevance score for the image query is computed based on the image similarity metric between two or more images associated with the image query and two or more matching images associated with the agriculture knowledge repository. The query relevance score for the image query is computed based on the similarity metric using the Equation 2, $$\text{Image Query Relevance Score } (R_{image}) = \quad \text{Equation 2}$$

$$\text{Similarity}(QI, \text{Agricultural Images Database})$$

Further, the computed query relevancy score is compared with the query threshold to terminate the process and receives the new multimedia user query high value triggers to extract contextual data.

Audio Query: If the farmer submits the audio query as input. The query relevance validator 202 processes the audio query with matching audio data from the agriculture knowledge repository. Here, the received audio query is first converted into the text query using Natural Language Processing (NLP) techniques. The resulting text query is then compared with the agricultural knowledge graph or repository containing information on agricultural vocabulary, crops, pests, diseases, and best practices. Further the query relevance score for the image query is computed based on the audio similarity metric between the textual content of the audio query and matching semantic text associated with the agriculture knowledge repository. The cosine similarity or Jaccard index are employed to determine the similarity metric between the audio-based text and the agriculture knowledge repository. The query relevance score for audio is determined based on the similarity metric using the Equation 3, $$\text{Audio Query Relevance Score } (R\_audio) = \quad \text{Equation 3}$$

$$\text{Similarity}(QA, \text{Knowledge Base})$$

Further, the computed query relevancy score is compared with the query threshold.

Video Query: If the farmer submits the video query as input. The query relevance validator 202 processes the video query with matching data from the agriculture knowledge repository. Initially, the video query is converted into textual content using at least one NLP techniques. Further, one or more images from the video query are extracted using a computer vision technique and NLP techniques. For example, extraction of text from the video query may include the techniques comprising, 1. speech recognition technique such as Automatic Speech Recognition (ASR) to transcribe spoken words to text. 2. Text processing, the NLP techniques such as Named Entity Recognition (NER) and Sentiment analysis to extract relevant information from the transcribed text. Further, video to images extraction may include 1. Frame extraction to break the video into frames to obtain individual images. 2. Object detection to detect computer vision techniques such as CNNs for detection of objects within each frame. 3. Image classification to identify and categorize objects or scenes in the frames. The two or more extracted images and the textual content are then processed and compared to the agricultural repository with two or more agricultural images and the one or more agricultural textual content respectively.

Further, a first similarity metric and a second similarity metric is determined to evaluate resemblance in both visual content and textual content. The first similarity metric is determined between the textual form of the video query and semantic matching text from the agriculture knowledge graph or repository as given in Equation 4. The second similarity metric is determined between two or more images associated with the image query and matching image from the agriculture knowledge graph or repository as given in Equation 4, $$\text{Video Query Relevance Score } (R\_video) = \quad \text{Equation 4}$$

$$(w * R\_image + (1 - w) * R\_audio)$$

w*R_image is Weighted Average of Image Query Score (QI), and R_audio is Audio Query Score (QA)

Further, the query relevance score for the video query is computed using a weighted average of the first similarity metric and the second similarity metric as given in Equation 5, $$\text{Query Relevance Score } = \quad \text{Equation 5}$$

$$(w\_text * R\_text) + (w\_image * R\_image) +$$

$$(w\_audio * R\_audio) + (w\_video * R\_video)$$

Further, the computed query relevancy score is compared with the query threshold. Here, w_text, w_image, w_audio, w_video are the weights for each of the form of the query such as text, images, audio, and video respectively. It is noted that the farmer may send one or more of these query types simultaneously. In such cases, the query relevance score is calculated as a weighted average of the individual relevance scores corresponding to each query type. The weighted average ensures that the overall relevance score considers the multiple facets of the query, thus providing a comprehensive assessment of its relevance.

At step 306 of the method 300 the one or more hardware processors are configured to extract a contextual data from the multimedia user query using at least one AI model, wherein the contextual data includes an agricultural field information, an environmental conditions of the agriculture field, and activities performed by the user in the agricultural field The validated user query is received by the multimedia user query insights extractor 204 to extract contextual data using at least one of AI or ML model. For example, the AI or ML model may include to process the text query, a named entity recognition (NER) and sentiment analysis, transformer-based models like BERT (bidirectional encoder representations from transformers) are employed to understand the textual components of the farmer's query. The image query may employ such as CNNs. The audio query may employ ASR techniques, Transformer-based Architectures and Deep Learning Models. The video query may employ a combination of CNN, ASR, sentiment analysis.

The contextual data engine 206 is used as reference for extracting contextual data. The contextual data engine 206 comprise an Agri knowledge graph. For the above example, the Agri knowledge graph reveals that the farmer has faced powdery mildew issues in previous seasons, which were managed with fungicide applications.

At this step, the multimedia user query insights extractor 204 extracts comprehensive contextual data pertaining to the farmer's specific situation are extracted for the Table 1 (Example multimedia-Image query). The data encompasses collecting information about the farmer's farm data, surrounding environmental data, soil conditions, weather, forecasts, and the farmer's profile. For example, The method collects farmer's farm data detailed information about the farmer's farm, including the crop type, the crop variety, the crop growth stage, sensor parameters (e.g., soil moisture, temperature), and satellite-derived indices. The collated data serves as the foundation for assessing the current state of the farm.

For the above example user query, the users farm data includes,

Crop: Soybean

Variety: Williams 82

Growth Stage: Flowering (R2)

Region/Climatic Zone: Midwest, USA

Season: Summer

Further, surrounding environmental data is collected which provides insights about the surrounding farm comprising weather forecasts, regional climate information, and climatic conditions which plays a crucial role in tailoring recommendations to the farmer's specific environment.

For the above example user query, the environmental Data:

Weather Forecast: The forecast predicts hot and dry conditions for the upcoming week, which could exacerbate the issue.

Climate: The Midwest region experiences occasional humidity during summer.

Further, the method collects farmer profile attributes associated with the farm providing historical information (Profile) about farmer's farming practices, past pest issues, disease management, and other relevant attributes. The knowledge graph serves as a valuable resource for understanding farmer's background and past experiences.

For the above example user query, the farmer's profile: Farmer's age (48 years), digital literacy (smart phone app users of for example facebook, whatsapp, youtube), average crop acreage (1.5 hectare in last 5 years), irrigation sources (borewell), historical crop data (Soybean, Cotton, Wheat) and production data, avg. financial profile (earning from farming 5.5 Lakhs INR/Annum).

Further, at step 308 of the method 300 the one or more hardware processors are configured to obtain a query insights from the multimedia user query, using at least one AI model or NLP based techniques. Here, the multimedia user query insights extractor 204 processes the multimedia user query to obtain the multimedia user query insights using robust combination of at least one AI model and the utilization of the knowledge graph.

Referring to the above Table 1 (Example multimedia-Image query), if the farmer submits either the image query or the video query as input the system employs advanced conventional object detection models are involved. For example, Convolutional Neural Networks (CNNs), and object detection techniques. These object detection models are equipped with techniques to precisely identify specific elements and objects within visual content provided by the farmer. The key features of object detection in this context includes Convolutional Neural Networks (CNNs) and Object Detection Algorithms. Convolutional Neural Networks (CNNs) are at the core of image and video processing. The deep learning models that are highly effective in recognizing patterns and features within the visual data. In this context, CNNs excel at identifying elements relevant to the farmer's query, such as crop diseases or other visual anomalies. Object Detection techniques state-of-the-art techniques such as YOLO (You Only Look Once) and Faster R-CNN are employed. Such existing techniques excel at efficient real-time object detection, allowing the system to rapidly identify and locate objects of interest in the media.

In another embodiment, if the farmer submits the text query or the audio query as input the method employs advanced conventional Natural Language Processing (NLP) models. In the context, the use of NLP models includes, Transformer-based Architectures and Deep Learning Models for Audio Analysis.

Transformer-based Architectures models such as BERT (Bidirectional Encoder Representations from Transformers) are employed to understand the textual components of the farmer's query. BERT for instance helps in capturing context and semantics of the text allowing the method to comprehend the farmer's textual description, extract relevant information, and infer the nuances of the query.

Further, Deep Learning Models processes the farmer's query in audio form, the method relies on deep learning models designed for audio analysis. These models transcribe the spoken words convert them into text, and subsequently analyze the audio content for meaning and context. This ensures that the system can fully comprehend and process the farmer's verbalized queries.

The combined process involves initial query processing using computer vision (CV) or NLP techniques to gain context. The application of these techniques results in detailed understanding of the farmer's query irrespective of whether its's in visual, textual, or audio form. The information extracted serves as a foundation for further analysis, contextualization, and response generation.

Example: Object Detection (Image, Video): The Object Detection Model is Utilized to Identify and Confirm the Presence of Powdery Mildew on the Soybean Leaf in the Image NLP (Text, Audio): Natural Language Processing models processes the farmer's audio query transcribing and understanding the spoken words. The models convert the audio message into text, allowing the system to analyze the farmer's description. BERT architecture is employed for this purpose.

Further referring to the step 310 of the method 300, the one or more hardware processors are configured to obtain for the multimedia user query one or more relevant indicators from a knowledge graph based on the contextual data, and the query insights.

The relevant indicators engine 232 fetches the contextual data and the multimedia user query as inputs. Further, these inputs are processed to obtain the one or more relevant indicators utilizing the knowledge graph based on the contextual data, and the query insights.

Further, for Table 1 (Example multimedia-Image query), the one or more relevant indicators are obtained from the knowledge graph 234 based on the contextual data and the multimedia user query insights. The knowledge graph 234 includes attributes relating to agricultural data comprising at least one of a crop type, a specific crop variety, crop growth stage, regional data, weather conditions, pest, diseases affecting the region and farm, parameter impacting those pest and their casual relationships, average historical and potential market price.

Referring to the above Table 1 (Example multimedia-Image query), the farmer's query reveals that there is an immediate issue of powdery mildew affecting soybean leaves. The knowledge graph 230 provides information about the crop, growth stage, region, weather conditions, and the farmer's past experiences. Further, knowledge assessment obtains known information which includes the presence of powdery mildew, the specific soybean variety, and the past management practices. The method identifies a knowledge gap regarding the optimal treatment in the current weather conditions.

Here, the knowledge graph 232 is structured to store information about various attributes related to the farm. This includes data about the crop type, specific crop variety, growth stage, regional data, weather conditions, pest, diseases affecting the region and farm, parameter impacting those pest or diseases and their casual relationships. These attributes are interconnected allowing for holistic understanding of the farmer's farm.

Further, the data obtained from the knowledge graph 234 is assessed by identifying the knowledge gaps and uncertainties to assess what is known (Known), what is not known (Unknown), and what information is needed (Needed). Known information is obtained from the knowledge graph and the data generated in previous steps. The assessment involves identifying knowledge gaps (Gaps) and uncertainties (Uncertainties).

Further referring to the step 312 of the method 300, the one or more hardware processors are configured to generate a personalized context for the multimedia user query using the contextual data and the one or more relevant indicators.

Referring again Table 1 (Example multimedia—Image query), the personalized context generator 208 obtains the contextual data and the one or more relevant indicators from the above step to generate the personalized context for the multimedia user query.

The steps of generating the personalized context for the multimedia query includes extracting comprehensive contextual data pertaining to the multimedia user query and the agricultural field information of the user from a plurality of sources. For example, the plurality of sources comprises at least one of (i) remote sensing data, (ii) on-farm sensor data, (iii) environmental data, (iv) historical data, (v) current forecast of meteorological and climate data, (vi) human participatory sensing information about crop, (vii) crop management, (viii) soil conditions, (ix) geospatial data of neighboring farms including soil condition, and (x) a user profile. Further, corresponding AI model is triggered to process the contextual data. The combination of CNN and object detection algorithms are triggered if the multimedia user query corresponds to the image user query and the video user query. The transformer based architectures and DL models are triggered if the multimedia user query corresponds to the text query and the audio query.

Now, referring to the step 314 of the method 300, the one or more hardware processors are configured to query a predefined prompt library comprising a plurality of baseline prompts to retrieve one or more matching prompts for the personalized context, wherein each prompt in the prompt library comprise a tagged category based on the context, topic, keywords, and domain specificity.

Once the personalized context is generated, the prompt library 210 is queried to retrieve matching prompt. The prompt library 210 is a repository of the plurality of baseline prompts comprising previously generated prompts and associated explanations providing relevant and informative responses.

The prompt library 210 is organized systematically with each prompt being tagged or categorized based on the context, topic, and specificity of the query. Each prompt may vary in terms of the farming scenario, crop type, growth stage, climate, and other parameters. The prompt library 210 is further utilized to store the multimedia user query the personalized context, the personalized context aware prompt, topics, keywords, the personalized explainable response, and the feedback.

To assess the suitability of prompts from the prompt library 210, the text similarity algorithms and context similarity algorithms are employed. These techniques are crucial for measuring how closely the existing prompts align with the current query's context and characteristics. This assessment helps to identify prompt that share commonalities of specific topic and context.

Further, the relevance of the prompts are stored in the library based on relevance evaluation. The relevance assessment is based on several factors, including the similarity in context, the specific attributes addressed, and the alignment with the farmer's query. This ensures that the responses are not only accurate but also directly applicable to the farmer's unique situation.

Further referring to the step 316 of the method 300, the one or more hardware processors are configured to generate using a context and domain aware generative AI model a personalized context aware prompt when no desired prompt is identified in the prompt library for the multimedia user query, wherein the personalized context aware prompt is generated using the plurality of baseline prompts, the query insights, and the personalized context.

Here, when no relevant prompt is identified in the prompt library 210, for the Table 1 (Example multimedia—Image query) the personalized context aware prompt is generated. The personalized context aware prompt is generated using the personalized context, a knowledge gap, the one or more relevant indicators obtained from the knowledge graph, and the plurality of baseline prompts. This ensures that the prompt is not generic but tailored precisely to the farmer's specific situation. The personalized context aware prompt is structured in a well-defined question format. This formulation is optimized to be clear, concise, and context aware.

Further referring to the step 318 of the method 300, the one or more hardware processors are configured to transmit the personalized context aware prompt to a plurality of large language models (LLMs) to obtain one or more responses.

Here, the personalized context aware prompt is transmitted to the plurality of large language models (LLMs) to obtain one or more responses. Each LLM may provide a different response, leveraging its unique knowledge and reasoning abilities. Each LLM, such as but not limited to GPT-4, GPT-5, or domain-specific models, brings its unique knowledge, reasoning abilities, and problem-solving approaches to the table.

Now referring to the step 320 of the method 300, the one or more hardware processors are configured to validate the one or more responses received for the personalized context aware prompt from the plurality of large language models to identify response based on similarity matching and iterative refinement.

The LLM response validator 216 validates the one or more responses received for the personalized context aware prompt (Table 1 Example) from the plurality of LLMs. The one or more response provided by the plurality of LLMs have information on at least one of response variability type comprising recommendations, solutions, explanations, diagnostic insights, and combination thereof.

LLM Selection: The system 100 strategically selects the plurality of LLMs based on their specialized domains and proficiencies. For example, a model with expertise in agriculture, crop diseases, or pest management may be consulted to address the specific query. Response Variability: As each LLM operates differently, the responses obtained from various models can exhibit notable variability. These responses may include recommendations, solutions, explanations, or diagnostic insights, among others.

During the one or more responses validation process, the system determines that the current responses are either insufficient or lack the desired precision, it employs an iterative approach to enhance the quality of the information gathered.

And iteratively each response is refined until the convergence criteria is satisfied, wherein the criteria specifies to obtain matching response for the multimedia user query utilizing text and context similarity technique, or otherwise the personalized context aware prompt is modified. Prompt Modification: The system may modify the prompt presented to the plurality of LLMs, refining its specificity and clarity. This iterative cycle continues until there is either a significant improvement in the responses or until the point of diminishing returns is reached.

The steps of each iteration until the convergence criteria is satisfied comprises: (a) assessing each response quality by comparing with existing agricultural data, scientific knowledge, and best practices. Quality Assessment: The system 100 assesses the quality of the responses by comparing them with existing agricultural data, scientific knowledge, and best practices. Quality measures encompass factors like factual accuracy, scientific soundness, and adherence to industry standards.

(b) evaluating relevancy of each response for the multimedia user query and broader agricultural context by checking alignment with the specific agricultural domain, crop type and the personalized context aware prompt. Relevance Evaluation: The relevance of the responses to both the query and the broader agricultural context is examined. This evaluation involves checking if the responses align with the specific agricultural domain, crop type, and the posed question and prompt.

Referring now to the responses of (Table 1 Example), LLM1 response received: "To combat powdery mildew in your soybean crop, you should consider applying a fungicide designed to target powdery mildew. Additionally, practice crop rotation to reduce disease pressure. Keep monitoring your field's humidity levels and implement proper irrigation to prevent excessive moisture."

LLM2 response received: "In your current situation, a holistic approach is essential. Begin by choosing a fungicide suitable for powdery mildew control on soybeans. Adjust your irrigation schedule to maintain moisture at an optimal level, considering the occasional humidity. Implement crop rotation to break the disease cycle and improve soil health." The system 100 validates the LLM responses and determines that both are relevant and scientifically sound based on agricultural knowledge. However, it combines additional insights regarding regional disease patterns and past farmer practices. Regional Data: The system 100 references a regional database indicating that powdery mildew is a common issue in the Midwest during hot and dry summers with occasional humidity. Past Farmer Practices: The farmer's history of applying fungicides in previous seasons is considered.

Further, security concerns for each response is evaluated by, (i) checking cybersecurity concerns for each response to ensure the content provided is free from malicious elements, (ii) performing content sensitivity analysis to determine if each response contains sensitive data, (iii) evaluating each response from an ethical perspective and privacy perspective. The LLM or GPT response validator 216 is designed to run comprehensive validation checks on the responses obtained from LLMs to validate one or more responses, considering various dimensions of safety, regulatory compliance, ethics, privacy, and content appropriateness. Cybersecurity Assessment: The LLM or GPT response validator 216 assesses the responses for cybersecurity concerns, ensuring that the content provided is free from malicious or harmful elements. This includes checking for potentially harmful code, links, or any security risks. Content Sensitivity Review: It conducts a content sensitivity analysis to determine if the responses contain sensitive or inappropriate material. This is vital to maintain a safe and respectful user experience. Relevance to Agriculture: The LLM or GPT response validator 216 verifies the relevance of the content to the agriculture domain, specifically addressing the question and prompt provided by the farmer. Responses that do not align with the agricultural context are flagged for further review. Ethical and Privacy Considerations: The GPT Response Validator also evaluates the responses from an ethical and privacy perspective, ensuring that the content complies with ethical guidelines and respects user privacy. The combined approach of interaction with each LLM iterative refinement, and the introduction of the LLM or GPT response validator 216 ensures that the responses gathered are both technically sound and contextually relevant to the agricultural query at hand. The introduction of the LLM or GPT response validator 216 adds an additional layer of safety, compliance, and relevance assurance, contributing to the system's overall reliability and trustworthiness.

Next step is to obtain a degree of similarity score between the current response and the response obtained in previous iterations and the steps are repeated until the convergence criteria is met. The degree of similarity score of each response is compared with a predefined threshold, to obtain response matching to the multimedia user query. Similarity Threshold: The predefined threshold is established to determine when the responses have reached a satisfactory level of convergence criteria. If the similarity score surpasses this threshold, it serves as an indicator that the responses have reached a stable and consistent state. At this point, the interaction with LLMs is halted, as further iterations are unlikely to yield substantial improvements.

Further referring to the step 322 of the method 300, the one or more hardware processors are configured to predict a contextually relevant user profile to compose the response suitable to the multimedia user query.

Furthermore, the one or more validated responses are evaluated to compose the relevant response suitable based on the user profile attributes and personalized insights. The contextually relevant user profile attributes is predicted based on the user preference format, language and tone, user's literacy level, user's past interactions, user's existing knowledge.

The relevant response composer 218 comprise a pool of response profile template aimed at tailoring responses to align with specific needs, preferences, and characteristics of the farmer. The relevant response composer 218 draws on a comprehensive user profile which includes a range of attributes to craft responses that resonate with the individual farmer.

The personalized explainable response assists the user in at least one of a multilingual content based on user preferred understandable language, and a multimodal content comprising the text response, the image response, the audio response, the video response, and combination thereof.

Now referring to Table 1 (Example) the response suitable to the multimedia user query is composed based on user profile personalization. The relevant response composer 218 generates response in written text, adopting a tone suitable for a farmer with moderate literacy. The response focuses on Soybean disease and pest management, draws from the user's past interactions, and addresses the unique challenges faced by Soybean growers in the Midwest region.

Here, the user profile attributes includes literacy level, user preferences, past interactions, and past interactions. Literacy Level: One fundamental attribute captured in the user profile is the farmer's literacy level. This data point provides insights into the user's ability to read, comprehend, and engage with textual content. The literacy level is assessed based on the user's educational background, language proficiency, and previous interactions with the system. User Preferences: The user profile delves into the farmer's preferences, encompassing how they prefer to receive information. This could include a preference for written text, audio content, visuals, or other multimedia formats. Understanding user preferences ensures that the response is delivered in the most accessible and user-friendly manner. Past Interactions: The user profile archives information about the farmer's previous interactions with the system. These interactions may include past queries, responses, and feedback. Analyzing historical data allows the relevant response composer 218 builds on prior knowledge and tailor responses to the farmer's evolving needs. Relevant Characteristics: In addition to the core attributes, the user profile can capture other characteristics relevant to the context. These characteristics might include the farmer's geographic location, specific challenges they face, or crop varieties they cultivate.

The relevant response composer 218 utilizes the insights received from the user profile to personalize responses comprising content format, language and tone, relevancy, and specificity. Content Format: Based on the farmer's preference, the module determines the most suitable format for delivering the response. For users with higher literacy levels, textual responses may be preferred. Others might benefit from audio explanations or visual aids. By tailoring the content format, the system enhances the accessibility and user-friendliness of the response. Language and Tone: The system adapts the language and tone of the response to match the user's literacy level and communication style. For farmers with higher literacy, responses can include more technical terminology and detailed explanations. For those with lower literacy, the language is simplified, and concepts are conveyed in a more straightforward manner. Relevance and Specificity: Personalization extends to the relevance and specificity of the response. By considering the user's past interactions, the module avoids redundancy and ensures that the response builds upon the user's existing knowledge. Specific recommendations, solutions, or insights are tailored to address the farmer's unique circumstances. Multilingual Support: For users with multilingual backgrounds, the relevant response composer 218 can deliver responses in the preferred language, ensuring clear communication and understanding.

For Example:

User Profile Attributes:

Literacy Level: Moderate

User Preferences: Prefers written text

Relevant Characteristics: Cultivates Soybean in the Midwest region.

Further referring to the step 324 of the method 300, the one or more hardware processors are configured to generate a personalized explainable response for the multimedia user query based on the response, contextually relevant user profile, and storing the multimedia user query with corresponding personalized explainable response in a blockchain platform and the prompt library.

Further, the personalized explainable response generator 220 generates the personalized explainable response for the multimedia user query combining user profile attributes with at least one of (i) technical explanation, (ii) contextual explanation, and (iii) semantic explanation.

The final response is generated by combining the technical response from LLMs with user profile attributes. Referring to the personalized explainable response generated for Table 1 (Example).

Technical Explanation: "Based on your unique situation, addressing powdery mildew in your Williams 82 variety soybean crop during the flowering stage in the Midwest's hot and occasionally humid conditions requires a targeted approach. It's advised to apply a fungicide specifically designed for powdery mildew control on soybeans. Adjust your irrigation practices to maintain optimal moisture levels, considering the occasional humidity in your region. Moreover, implementing crop rotation is crucial to break the disease cycle and improve soil health."

Contextual Explanation: "Considering the region's climate, past powdery mildew experiences, and the current flowering stage of your soybean crop, the response emphasizes precision in addressing the issue."

Semantic Explanation: The response is provided in written format as per the farmer's digital literacy preference.

The technical explanation for the response provides detailed explanation of the response, the contextual information associated with the response, reasoning behind the selection of the response, the explanation about LLMs used and reasoning applied to select the LLMs from the plurality of LLMs.

Technical Explanation provides a detailed explanation of how the output was generated and the reasoning why it was chosen. It may include the specific LLMs used, the reasoning behind the response, and any algorithms or models applied in the decision-making process. LLM Selection: The system 100 specifies which LLMs were consulted to generate the response. It may involve multiple LLMs, each chosen for its expertise or domain knowledge. Reasoning Process: A step-by-step description of the reasoning process applied by the LLMs is provided. This includes details about how the models interpreted the query, evaluated potential solutions, and made recommendations. Algorithms and Models: The specific algorithms, machine learning models, or deep learning architectures that contributed to the response are highlighted. This may include the use of transformer-based models like BERT, GPT, or specialized models for agricultural problem-solving.

The semantic explanation for the response is generated based on user preference format comprising at least one of (i) textual response in written textual explanation, (ii) audio response in spoken explanation allowing user to listen to response recommendation, (iii) visual response in image, chart, graphs, and infographics in visual representation, and (iv) providing animated response. Semantic Explanation, the term "semantic" here can refer to the form of the response, which could include text, audio, visuals, animations, or any medium that best conveys the information. The choice of the semantic explanation depends on the user's preferences and the nature of the response. Text: The response may be presented as written text, catering to farmers who prefer reading and textual explanations. Audio: For users who prefer spoken explanations, the response can be converted into an audio format, allowing farmers to listen to the recommendations. Visuals: Visual aids, such as images, charts, graphs, and infographics, are employed when visual representation enhances comprehension. These visuals can illustrate concepts, data, or recommended practices. Animations: In some cases, animations may be used to convey complex processes or procedures visually. Animations are valuable for demonstrating step-by-step actions or dynamic concepts. User Preferences: The choice of semantic explanation is adaptable and personalized to meet the user's preferences. The system can detect and apply the preferred format based on the user's profile attributes, ensuring the content is presented in the most accessible and comprehensible manner.

The contextual explanation for the response is generated based on crop specific details, environmental conditions, and historical insights. Contextual Explanation provides the response in the context of the problem and the farmer's farm. It may reference specific data, such as the crop type, growth stage, environmental conditions, and past experiences, to explain why the response is relevant. Crop-Specific Details: The response considers the crop type (e.g., soybean), growth stage (e.g., flowering stage, R2), and other crop-related parameters, ensuring that the recommendations are tailored to the specific crop's requirements. Environmental Considerations: Environmental data, such as regional climate, weather forecasts, and historical climatic conditions, is factored in. It explains how these factors influence the recommended course of action. Historical Insights: The system 100 leverages information from the farmer's past experiences and interactions, including previous pest issues and disease management strategies. This historical context aids in generating recommendations that align with the farmer's evolving needs.

Further, the blockchain framework 224 is utilized to store the multimedia user query, the personalized context, the personalized context aware prompt, the personalized explainable response, and the feedback. Once the personalized explainable response is generated, including the user's query, the generated prompt, details of the consulted GPT models, Explainability scores, and the overall processing time, the system proceeds to store this crucial information in a secure and decentralized manner on the blockchain. This blockchain serves as an immutable ledger, ensuring the transparency and integrity of the entire process. Additionally, the system retains this information in structured databases with appropriate labels and tags, making it easily accessible for the entire system's auto-learning and improvement mechanisms. Blockchain Storage: The final response data is hashed and securely stored on the blockchain. Each piece of information, including the user's query, prompt, GPT model details, Explainability scores, and processing time, is timestamped and linked to the previous block, creating a chain of blocks that is tamper-resistant and transparent.

Smart Contracts: Smart contracts are deployed on the blockchain to manage the storage and retrieval of response-related data. These contracts ensure that only authorized users or system components can access or modify the stored information.

Database Integration: In parallel, the response details are also stored in databases. These databases are designed with appropriate labels and tags to categorize and organize the information. The labels and tags could include the type of query, specific crop or issue discussed, GPT model used, and more. This structured storage allows for efficient retrieval and analysis of the stored data.

Auto-Learning and Improvement: The structured data in databases serves as a valuable resource for the system's auto-learning and improvement mechanisms. Machine learning algorithms can analyze past queries, prompts, GPT interactions, and their outcomes. This analysis can lead to optimizations in prompt generation, model selection, and response quality over time.

User Information: The blockchain-based platform is also used to securely communicate the response and associated details back to the end user. The blockchain ensures data integrity and privacy while enabling users to access their responses and related information at any time.

Further referring to the step 326 of the method 300, the one or more hardware processors are configured to trigger to receive a feedback form from the user for the personalized explainable response.

The feedback generator and feedback response processor 222 triggers the feedback form enabling the user to provide feedback in at least one of the text input, or rating, or answering specific survey questions, wherein the feedback provided by the user enables adaptive improvement and the user experience. Feedback provided by the user enables for further improvement. After providing the farmer with the response, the system actively collects feedback from the farmer to gauge the response's relevance and usefulness. Feedback Collection Mechanisms: Feedback mechanisms can take various forms, including surveys, ratings, or other user input channels, ensuring that the system understands the farmer's perspective and experience. The system is equipped with various channels for collecting feedback from the farmer. These channels include user-friendly interfaces where farmers can rate the provided response, provide comments, or answer specific survey questions. Additionally, the system can collect implicit feedback, such as tracking user interactions and measuring user engagement with the provided recommendations.

In addition, the feedback generator and feedback response processor 222 is capable of trigger and collect feedback from the in-situ sensors or satellite remote sensing or combination thereof based on the personalized explainable response and one or more monitoring parameters. The one or more monitoring parameters are identified based on the personalized context, the personalized explainable response, and the knowledge graph.

Remote Monitoring: In parallel with feedback collection, the system integrates remote monitoring capabilities utilizing data from remote sensing technologies and relevant in-situ sensors. These sensors can capture real-time data on environmental conditions, crop health, and pest or disease presence. The data collected from these sources contributes to a holistic understanding of the farmer's situation.

Assessment of Compliance: The system employs algorithms to assess the degree of compliance with the recommended advice. By cross-referencing the user's actions with the provided recommendations, the system can determine whether the farmer followed the suggested course of action. This assessment is used to gauge the effectiveness of the recommendations in practice.

Continuous Improvement: The feedback collected, user interactions, and remote monitoring data play a crucial role in the system's continuous improvement. Machine learning and data analysis techniques are applied to identify patterns and correlations between feedback, recommendations, and outcomes. This analysis helps in refining the recommendation algorithms and the context-awareness of the system over time.

Reinforcement Learning: The system may incorporate reinforcement learning techniques, where feedback serves as valuable reinforcement signals. Positive feedback on recommendations that lead to successful outcomes strengthens the model's behavior, while negative feedback prompts adjustments. Over time, this iterative process fine-tunes the system's recommendation capabilities.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of generating personalized explainable response. The embodiment, thus provides system and method for providing personalized explainable response by generating multimedia prompt using contextual information. Moreover, the embodiments herein actively engages with farmer feedback, monitoring real-world outcomes through remote sensing and sensors, and utilizing data-driven analysis, the system aims to evolve and improve continuously. The integration of feedback and compliance assessment ensures that the system adapts to changing conditions and provides increasingly effective and context-aware recommendations to farmers.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for providing personalized explainable response, the method comprising:

receiving from a user via one or more hardware processor, a multimedia user query, wherein the multimedia user query is received in at least one of a form comprising a text query, an image query, an audio query, a video query, and combination thereof;

validating via the one or more hardware processors, the multimedia user query relates to agricultural domain by computing a query relevancy score, wherein the query relevancy score with a low value triggers to terminate the process and receives a new multimedia user query, and the query relevancy score with a high value triggers to extract contextual data;

extracting via the one or more hardware processors, a contextual data from the multimedia user query using at least one Artificial Intelligence (AI) model, wherein the contextual data includes an agricultural field information, an environmental conditions of the agriculture field, and activities performed by the user in the agricultural field;

obtaining via the one or more hardware processors, a query insights from the multimedia user query using at least one AI model or Natural Language Processing (NLP) based techniques;

obtaining for the multimedia user query via the one or more hardware processors, one or more relevant indicators from a knowledge graph based on the contextual data, and the query insights;

generating via the one or more hardware processors, a personalized context for the multimedia user query using the contextual data and the one or more relevant indicators;

querying via the one or more hardware processors, a predefined prompt library comprising a plurality of baseline prompts to retrieve one or more matching prompts for the personalized context, wherein each prompt in the prompt library comprise a tagged category based on the context, topic, keywords, and domain specificity;

generating using a context and domain aware generative AI model via the one or more hardware processors, a personalized context aware prompt when no desired prompt is identified in the prompt library for the multimedia user query, wherein the personalized context aware prompt is generated using the plurality of baseline prompts, the query insights, and the personalized context;

transmitting via the one or more hardware processors, the personalized context aware prompt to a plurality of large language models (LLMs) to obtain one or more responses;

validating via the one or more hardware processors, the one or more responses received for the personalized context aware prompt from the plurality of large language models to identify response based on similarity matching and iterative refinement;

predicting via the one or more hardware processors, a contextually relevant user profile to compose the response suitable to the multimedia user query;

generating via the one or more hardware processors, a personalized explainable response for the multimedia user query based on the response, contextually relevant user profile, and storing the multimedia user query with corresponding personalized explainable response in a blockchain platform and the prompt library; and triggering via the one or more hardware processors, to receive a feedback form from the user for the personalized explainable response.

2. The processor implemented method as claimed in claim 1, wherein the query relevance score for the text query is a text similarity metric between the textual content of the text query and matching semantic text associated with an agriculture knowledge repository, wherein the query relevance score for the image query is an image similarity metric between two or more images associated with the image query and two or more matching images associated with the agriculture knowledge repository, wherein the query relevance score for the audio query is computed by (i) converting the audio query into textual content using at least one NLP technique, and (ii) obtaining an audio similarity metric between the textual content of the audio query and matching semantic text associated with the agriculture knowledge repository, and wherein the query relevance score for the video query is computed by, converting the video query into textual content using at least one NLP technique, extracting one or more images from the video query using a computer vision technique, obtaining a first similarity metric between the textual form of the audio query and matching semantic text associated with the agriculture knowledge repository, and a second similarity metric between two or more images associated with the image query and two or more images associated with the agriculture knowledge repository, and computing the query relevance score for the video query using a weighted average of the first similarity metric and the second similarity metric.

3. The processor implemented method as claimed in claim 1, wherein the personalized context for the multimedia user query is generated by, extracting comprehensive contextual data of the multimedia user query and the agricultural field information of the user from a plurality of sources comprising (i) remote sensing data, (ii) on-farm sensor data, (iii) environmental data, (iv) historical data, (v) current forecast of meteorological and climate data, (vi) human participatory sensing information about crop, (vii) crop management, (viii) soil conditions, (ix) geospatial data of neighboring farms including soil condition, and (x) the user profile;

triggering corresponding AI model to process the contextual data, wherein a combination of CNN and object detection techniques are triggered to process the image user query and the video user query, and wherein a transformer based architectures and DL models are triggered to process the text query and the audio query;

obtaining one or more relevant indicators from the knowledge graph based on the contextual data and the query insights, wherein the knowledge graph includes a crop type, a specific crop variety, a crop growth stage, a regional data, a weather conditions, a pest, one or more diseases affecting the region and farm, one or more parameters impacting the pest and their casual relationships, an average historical and potential market price; and generating the personalized context in a template using the contextual data, the query insights, the one or more relevant indicators from the knowledge graph, and evaluating the template with a predefined context template from the prompt library.

4. The processor implemented method as claimed in claim 1, wherein the personalized context aware prompt is generated using the personalized context, a knowledge gap, the one or more relevant indicators, and the plurality of baseline prompts.

5. The processor implemented method as claimed in claim 1, wherein the one or more responses received from the plurality of LLMs are validated by, obtaining the one or more responses from the plurality of LLMs, and each response provides response variability type information comprising recommendations, explanations, domain based insights, and combination thereof;

iteratively refining each response until a convergence criteria is satisfied, wherein the criteria specifies to obtain response for the multimedia user query utilizing text and context similarity technique, or updating the personalized context aware prompt, wherein the steps of each iteration comprises:

assessing each response quality by comparing with the agriculture knowledge repository, scientific knowledge, and best practices;

evaluating relevancy of each response for the multimedia user query by checking alignment with the specific agricultural domain, the crop type, and the personalized context aware prompt;

evaluating security concerns for each response by, (i) checking cybersecurity concerns for each response to ensure the response is free from malicious elements, (ii) performing content sensitivity analysis to determine if each response contains sensitive data, (iii) evaluating each response from an ethical perspective and privacy perspective;

obtaining a degree of similarity score between the current response and the response obtained in previous iterations; and repeating the steps until the convergence criteria is met to obtain response matching to the multimedia user query by comparing the degree of similarity score of each response with a predefined threshold.

6. The processor implemented method as claimed in claim 1, wherein the contextually relevant user profile are predicted based on user's preference format, languages and tone, user's literacy level, user's past interactions, and user's existing knowledge.

7. The processor implemented method as claimed in claim 1, wherein assisting the user's personalized explainable response in multilingual content based on user preferred understandable language, and a multimodal content comprising the text response, the image response, the audio response, the video response, and combination thereof.

8. The processor implemented method as claimed in claim 1, wherein the personalized explainable response for the multimedia user query is generated using at least one of (i) a technical explanation, (ii) a contextual explanation, and (iii) a semantic explanation.

9. The processor implemented method as claimed in claim 8, wherein the technical explanation for the response provides detailed explanation of the response, the contextual information associated with the response, reasoning behind the selection of the response, the explanation about LLMs used and reasoning applied to select corresponding LLM from the plurality of LLMs.

10. The processor implemented method as claimed in claim 8, wherein the semantic explanation for the response is generated based on user preference format comprising at least one of (i) a textual response in written textual explanation, (ii) a audio response in spoken explanation allowing user to listen to response recommendation, (iii) a visual response in image, chart, graphs, and infographics in visual representation, and (iv) providing animated response.

11. The processor implemented method as claimed in claim 8, wherein the contextual explanation for the response is generated based on the crop specific details, the environmental conditions, and the historical insights.

12. The processor implemented method as claimed in claim 1, wherein the prompt library is utilized to store the multimedia user query, the personalized context, the personalized context aware prompt, topics, keywords, the personalized explainable response, and the feedback.

13. The processor implemented method as claimed in claim 1, wherein the blockchain platform is utilized to store the multimedia user query, the personalized context, the personalized context aware prompt, topics, keywords, the personalized explainable response, and the feedback.

14. The processor implemented method as claimed in claim 1, wherein the feedback form enables the user to provide feedback in at least one of a text input, or a rating, or answering specific survey questions, wherein the feedback provided by the user enables adaptive improvement and the user experience.

15. The processor implemented method as claimed in claim 1, wherein the personalized explainable response triggers feedback based on one or more monitoring parameters to obtain the data using one of on-field sensors, satellite remote sensing or combination thereof, wherein the monitoring parameters are identified based on the personalized context, the personalized explainable response, and the knowledge graph.

16. A system for providing personalized explainable response comprising:

a memory storing instructions;

one or more communication interfaces; and one or more hardware processors coupled to the memory via the one or more communication interfaces, wherein the one or more hardware processors are configured by the instructions to:

receive from a user a multimedia user query, wherein the multimedia user query is received in at least one of a form comprising a text query, an image query, an audio query, a video query, and combination thereof;

validate the multimedia user query relates to agricultural domain by computing a query relevancy score, wherein the query relevancy score with a low value triggers to terminate the process and receives a new multimedia user query, and the query relevancy score with a high value triggers to extract contextual data;

extract a contextual data from the multimedia user query using at least one Artificial Intelligence (AI) model, wherein the contextual data includes an agricultural field information, an environmental conditions of the agriculture field, and activities performed by the user in the agricultural field;

obtain a query insights from the multimedia user query using at least one AI model or Natural Language Processing (NLP) based techniques;

obtain for the multimedia user query one or more relevant indicators from a knowledge graph based on the contextual data, and the query insights;

generate a personalized context for the multimedia user query using the contextual data and the one or more relevant indicators;

query a predefined prompt library comprising a plurality of baseline prompts to retrieve one or more matching prompts for the personalized context, wherein each prompt in the prompt library comprise a tagged category based on the context, topic, keywords, and domain specificity;

generate using a context and domain aware generative AI model a personalized context aware prompt when no desired prompt is identified in the prompt library for the multimedia user query, wherein the personalized context aware prompt is generated using the plurality of baseline prompts, the query insights, and the personalized context;

transmit the personalized context aware prompt to a plurality of large language models (LLMs) to obtain one or more responses;

validate the one or more responses received for the personalized context aware prompt from the plurality of large language models to identify response based on similarity matching and iterative refinement;

predict a contextually relevant user profile to compose the response suitable to the multimedia user query;

generate a personalized explainable response for the multimedia user query based on the response, contextually relevant user profile, and storing the multimedia user query with corresponding personalized explainable response in a blockchain platform and the prompt library; and trigger to receive a feedback form from the user for the personalized explainable response.

17. The system as claimed in claim 16, wherein the query relevance score for the text query is a text similarity metric between the textual content of the text query and matching semantic text associated with an agriculture knowledge repository, wherein the query relevance score for the image query is an image similarity metric between two or more images associated with the image query and two or more matching images associated with the agriculture knowledge repository, wherein the query relevance score for the audio query is computed by (i) converting the audio query into textual content using at least one NLP technique, and (ii) obtaining an audio similarity metric between the textual content of the audio query and matching semantic text associated with the agriculture knowledge repository, and wherein the query relevance score for the video query is computed by, converting the video query into textual content using at least one NLP technique, extracting one or more images from the video query using a computer vision technique, obtaining a first similarity metric between the textual form of the audio query and matching semantic text associated with the agriculture knowledge repository, and a second similarity metric between two or more images associated with the image query and two or more images associated with the agriculture knowledge repository, and computing the query relevance score for the video query using a weighted average of the first similarity metric and the second similarity metric.

18. The system as claimed in claim 16, wherein the personalized context for the multimedia user query is generated by, extracting comprehensive contextual data of the multimedia user query and the agricultural field information of the user from a plurality of sources comprising (i) remote sensing data, (ii) on-farm sensor data, (iii) environmental data, (iv) historical data, (v) current forecast of meteorological and climate data, (vi) human participatory sensing information about crop, (vii) crop management, (viii) soil conditions, (ix) geospatial data of neighboring farms including soil condition, and (x) the user profile;

triggering corresponding AI model to process the contextual data, wherein a combination of CNN and object detection techniques are triggered to process the image user query and the video user query, and wherein a transformer based architectures and DL models are triggered to process the text query and the audio query;

obtaining one or more relevant indicators from the knowledge graph based on the contextual data and the query insights, wherein the knowledge graph includes a crop type, a specific crop variety, a crop growth stage, a regional data, a weather conditions, a pest, one or more diseases affecting the region and farm, one or more parameters impacting the pest and their casual relationships, an average historical and potential market price; and generating the personalized context in a template using the contextual data, the query insights, the one or more relevant indicators from the knowledge graph, and evaluating the template with a predefined context template from the prompt library.

19. One or more non-transitory machine-readable information storage mediums comprising one or more instructions which when executed by one or more hardware processors cause:

receiving from a user a multimedia user query, wherein the multimedia user query is received in at least one of a form comprising a text query, an image query, an audio query, a video query, and combination thereof;

validating the multimedia user query relates to agricultural domain by computing a query relevancy score, wherein the query relevancy score with a low value triggers to terminate the process and receives a new multimedia user query, and the query relevancy score with a high value triggers to extract contextual data;

extracting a contextual data from the multimedia user query using at least one Artificial Intelligence (AI) model, wherein the contextual data includes an agricultural field information, an environmental conditions of the agriculture field, and activities performed by the user in the agricultural field;

obtaining a query insights from the multimedia user query using at least one AI model or Natural Language Processing (NLP) based techniques;

obtaining for the multimedia user query one or more relevant indicators from a knowledge graph based on the contextual data, and the query insights;

generating a personalized context for the multimedia user query using the contextual data and the one or more relevant indicators;

querying a predefined prompt library comprising a plurality of baseline prompts to retrieve one or more matching prompts for the personalized context, wherein each prompt in the prompt library comprise a tagged category based on the context, topic, keywords, and domain specificity;

generating using a context and domain aware generative AI model a personalized context aware prompt when no desired prompt is identified in the prompt library for the multimedia user query, wherein the personalized context aware prompt is generated using the plurality of baseline prompts, the query insights, and the personalized context;

transmitting the personalized context aware prompt to a plurality of large language models (LLMs) to obtain one or more responses;

validating the one or more responses received for the personalized context aware prompt from the plurality of large language models to identify response based on similarity matching and iterative refinement;

predicting a contextually relevant user profile to compose the response suitable to the multimedia user query;

generating a personalized explainable response for the multimedia user query based on the response, contextually relevant user profile, and storing the multimedia user query with corresponding personalized explainable response in a blockchain platform and the prompt library; and triggering to receive a feedback form from the user for the personalized explainable response.

20. The one or more non-transitory machine-readable information storage mediums of claim 19, wherein the query relevance score for the text query is a text similarity metric between the textual content of the text query and matching semantic text associated with an agriculture knowledge repository, wherein the query relevance score for the image query is an image similarity metric between two or more images associated with the image query and two or more matching images associated with the agriculture knowledge repository, wherein the query relevance score for the audio query is computed by (i) converting the audio query into textual content using at least one NLP technique, and (ii) obtaining an audio similarity metric between the textual content of the audio query and matching semantic text associated with the agriculture knowledge repository, and wherein the query relevance score for the video query is computed by, converting the video query into textual content using at least one NLP technique, extracting one or more images from the video query using a computer vision technique, obtaining a first similarity metric between the textual form of the audio query and matching semantic text associated with the agriculture knowledge repository, and a second similarity metric between two or more images associated with the image query and two or more images associated with the agriculture knowledge repository, and computing the query relevance score for the video query using a weighted average of the first similarity metric and the second similarity metric.

\* \* \* \* \*